US009444553B2

(12) United States Patent
Lee (10) Patent No.: US 9,444,553 B2
(45) Date of Patent: Sep. 13, 2016

(54) TUNABLE COHERENT OPTICAL RECEIVER AND METHOD

(71) Applicant: Lumentum Operations LLC, Milpitas, CA (US)

(72) Inventor: Kun-Jing Lee, Fremont, CA (US)

(73) Assignee: Lumentum Operations LLC, Milpitas, CA (US)

( * ) Notice: Subject to any disclaimer, the term of this patent is extended or adjusted under 35 U.S.C. 154(b) by 16 days.

(21) Appl. No.: 13/934,890

(22) Filed: Jul. 3, 2013

(65) Prior Publication Data

US 2014/0010543 A1    Jan. 9, 2014

Related U.S. Application Data

(60) Provisional application No. 61/668,343, filed on Jul. 5, 2012.

(51) Int. Cl.
*H04J 14/02* (2006.01)
*H04B 10/06* (2006.01)
*H04B 10/61* (2013.01)

(52) U.S. Cl.
CPC ............ *H04B 10/61* (2013.01); *H04B 10/615* (2013.01); *H04B 2210/075* (2013.01)

(58) Field of Classification Search
CPC ............ H04B 10/6166; H04B 10/616; H04B 10/0773; H04B 10/074; H04J 14/0276
USPC .......................................... 398/79, 202, 204
See application file for complete search history.

(56) References Cited

U.S. PATENT DOCUMENTS

| 4,618,981 | A | * | 10/1986 | Ecklund ................. G01R 23/15 324/76.53 |
|---|---|---|---|---|
| 5,956,165 | A | | 9/1999 | Fee et al. ......................... 398/78 |
| 6,476,681 | B1 | * | 11/2002 | Kirkpatrick ............ H03L 7/093 331/1 A |
| 6,867,600 | B1 | * | 3/2005 | Iskanius ................. G01R 31/11 324/534 |
| 6,937,823 | B2 | | 8/2005 | Israel et al. ...................... 398/83 |
| 7,362,972 | B2 | | 4/2008 | Yavor et al. ..................... 398/30 |
| 7,792,425 | B2 | | 9/2010 | Aronson et al. ................ 398/30 |
| 7,907,806 | B2 | | 3/2011 | Yamazaki ....................... 385/39 |
| 8,068,742 | B2 | | 11/2011 | Cole et al. ..................... 398/152 |
| 8,078,064 | B2 | | 12/2011 | Ito ................................. 398/202 |
| 8,326,145 | B2 | | 12/2012 | Takahara ......................... 398/33 |
| 8,401,351 | B2 | | 3/2013 | Inoue et al. ..................... 385/45 |
| 8,472,759 | B2 | | 6/2013 | Sugiyama .......................... 385/3 |
| 8,472,814 | B2 | | 6/2013 | Zhang et al. ................. 398/208 |
| 8,494,368 | B2 | | 7/2013 | Xie et al. ......................... 398/81 |

(Continued)

OTHER PUBLICATIONS

"Combining 40G DP-QPSK with 10G OOK channels on metro/regional networks" by N. L. Swenson, Lightwave®, Dec. 2012.

(Continued)

*Primary Examiner* — David Payne
*Assistant Examiner* — Pranesh Barua
(74) *Attorney, Agent, or Firm* — Harrity & Harrity, LLP (57) ABSTRACT

The invention provides a tunable coherent optical receiver and a related method wherein the receiver uses low-frequency trace-tone modulation of optical WDM channels at transmission as channel IDs in order to detect which optical channels are present in the received optical WDM signal. The receiver than discriminates between the thereby detected optical channels by tuning a local oscillator to one of the received optical channels as determined based on the presence of the low-frequency tones in the received optical signal.

20 Claims, 9 Drawing Sheets

(56) References Cited

U.S. PATENT DOCUMENTS

| | | | |
|---|---|---|---|
| 8,526,102 B2 | 9/2013 | Inoue et al. | 359/325 |
| 8,526,830 B2 | 9/2013 | Frisken | 398/202 |
| 2002/0034191 A1* | 3/2002 | Shattil | H04L 1/04 370/464 |
| 2003/0025957 A1* | 2/2003 | Jayakumar | H04B 10/00 398/5 |
| 2003/0090767 A1* | 5/2003 | Yap | G02B 6/2861 398/183 |
| 2004/0062548 A1* | 4/2004 | Obeda | H04B 10/00 398/25 |
| 2008/0316090 A1* | 12/2008 | Shirakawa | G01S 13/325 342/195 |
| 2009/0196603 A1* | 8/2009 | Zhou | H04B 10/0773 398/32 |
| 2011/0123197 A1* | 5/2011 | Taylor | H04J 14/02 398/79 |
| 2011/0188866 A1* | 8/2011 | Maeda | 398/162 |
| 2011/0249969 A1* | 10/2011 | Ji | H04B 10/60 398/45 |
| 2011/0274429 A1* | 11/2011 | Caplan | H04B 10/5561 398/65 |
| 2011/0318019 A1* | 12/2011 | Nissov | H04B 10/2513 398/159 |
| 2012/0008952 A1* | 1/2012 | Li | H04B 10/50 398/65 |
| 2012/0087661 A1* | 4/2012 | Look | H04B 10/6161 398/65 |
| 2013/0259490 A1* | 10/2013 | Malouin | H04B 10/6166 398/152 |
| 2013/0286847 A1* | 10/2013 | Schmidt | H04J 14/0276 370/241 |
| 2014/0079390 A1* | 3/2014 | Kim | H04B 10/0773 398/30 |

OTHER PUBLICATIONS

"Widely tunable DS-DBR laser with monolithically integrated SOA: design and performance" published in Selected Topics in Quantum Electronics, IEEE Journal of (vol. 11, Issue: 1), Jan. 2005 by Ward, A.J. and et al.

* cited by examiner

TUNABLE COHERENT OPTICAL RECEIVER AND METHOD

CROSS-REFERENCE TO RELATED APPLICATIONS

The present invention claims priority from U.S. Patent Application No. 61/668,343 filed Jul. 5, 2012, which is incorporated herein by reference.

TECHNICAL FIELD

The present invention generally relates to optical communications, and more specifically relates to tunable coherent optical receivers using trace tone modulation for optical channel recognition and tuning.

BACKGROUND OF THE INVENTION

The need to transmit ever increasing amounts of data necessitates the development of optical communication systems that combine dense wavelength division multiplexing (DWDM) of optical channels with advanced spectral-efficient modulation formats incorporating phase modulation. One of the data transmission technologies considered is the Dual-Polarization Quadrature Phase-Shift Keying, or "DP-QPSK", in combination with the coherent detection at the receiver. The DP-QPSK modulation format includes transmitting two orthogonally polarized light signals, each phase-modulated with two quadrature 'I' and 'Q' signals according to the QPSK modulation format. The advantages of this technique, in addition to the spectral efficiency, includes robustness with respect to the chromatic dispersion (CD) and the polarization mode dispersion (PMD) in optical fibers.

Besides having intrinsically large PMD and CD tolerance, the coherent detection of the phase-modulated light at the receiver can also be used to implement "colorless receivers" and therefore "colorless networks", that is networks without specific wavelengths assigned to individual add/drop (A/D) ports; see for example an article "Combining 40G DP-QPSK with 10G OOK channels on metro/regional networks" by N. L. Swenson, Lightwave®, December 2012. With a coherent detection, the receiver may be able to select a desired channel from multiple received channels simply by tuning a local oscillator (LO) laser without the need for an optical DEMUX, a wavelength selective switch (WSS), or a reconfigurable add-drop module (ROADM), thereby reducing optical loss in the network, greatly simplifying the network, an making it potentially less expensive. This can reduce the number of ROADM/WSS elements required in the network and dramatically simplify network topology. However, wavelength tuning in most commercially available tunable lasers that can be used as local oscillators in a tunable coherent receiver is relatively slow, so that tuning or switching the LO laser wavelength from one DWDM channel to another takes tens of seconds or even minutes. Furthermore, the slow channel switching times make the receiver auto-configuration procedure too long for many real-life network applications, as it may involve scanning the entire channel spectrum to identify all the received channels.

An object of the present invention is to overcome the shortcomings of the prior art by providing a method for fast channel detection and/or auto-configuration at a coherent receiver, and a tunable optical receiver implementing the method.

SUMMARY OF THE INVENTION

Accordingly, the present invention relates to a method for operating a coherent receiver in a WDM system comprising a plurality of optical transmitters for transmitting a plurality of optical WDM channels carrying high-speed data signals, wherein low-frequency trace tones are used to identify optical channels, wherein the receiver is provided with a trace detector for detecting the presence or absence of the trace tones, and wherein the trace tones detected at the receiver are used to configure the receiver for receiving a particular optical channel.

In accordance with an aspect of the present invention, the method comprises i) modulating each of the optical WDM channels with a unique low-frequency trace tone, and ii) at the coherent receiver, performing the following operations: a) splitting a received optical signal comprising one or more of the optical WDM channels into first and second optical signal portions; b) directing a first optical signal portion to a coherent detection & demodulation circuit (CDC) comprising a tunable local oscillator (LO) source of an optical LO signal; c) directing a first optical signal portion to a trace tone detection circuit (TTDC) for detecting the presence of one or more low-frequency tones therein; d) using information about the one or more trace tones present in the received optical signal to identify the one or more received optical channels, and to select one of the received optical channels therefrom; e) tuning the LO source to the selected optical channel; and, f) mixing the LO optical signal with the second optical signal portion for coherently de-modulating the selected optical channel.

An aspect of the present invention relates to a tunable coherent optical receiver for receiving an optical WDM signal which comprises one or more optical channels carrying high-speed data signals, wherein each of the one or more optical channels is modulated with a low-frequency trace tone uniquely associated with said optical channel. The tunable coherent optical receiver comprises the following elements: an optical splitter for splitting a received optical WDM signal into first and second optical signal portions, a coherent detection/demodulation circuit (CDC) coupled to the optical splitter for receiving the first optical signal portion and for selectively and coherently demodulating the high-speed data signal from one of the one or more optical channels, wherein the CDC comprises a tunable local oscillator (LO) source of an optical LO signal, and a trace tone detection circuit (TTDC) coupled to the optical splitter for receiving the second optical signal portion and adopted for detecting the presence of one or more low-frequency trace tones therein and for generating a trace detection signal identifying one or more low-frequency trace tones that are present in the received optical signal. The tunable coherent optical receiver further includes an LO control circuit that is coupled to the tunable source for tuning an optical frequency thereof to a selected optical channel that is selected among the one or more optical channels present in the received optical signal based on the trace presence information.

According to feature of the present invention, the tunable coherent optical receiver may further include a microcontroller coupled to the LO control circuit for providing thereto a channel selection signal for tuning the LO frequency to the selected optical channel, wherein the microcontroller may comprise hardware or software logic for selecting the selected optical channel based on the trace presence signal received from the TTDC. Accordingly, in this aspect of the invention the tunable coherent receiver is able to auto-configure itself by automatically performing channel discovery and selection upon start-up or a change in the system configuration.

BRIEF DESCRIPTION OF THE DRAWINGS

The invention will be described in greater detail with reference to the accompanying drawings which represent preferred embodiments thereof, in which like elements are indicated with like reference numerals, and wherein.

DETAILED DESCRIPTION

The following definitions are applicable to embodiments of the invention: the terms 'high-speed signal', 'high-frequency signal', 'high data rate signal', 'broad-band signal', high-speed data, and 'broad-band data' refer to data, typically user-originated, and/or corresponding signals that are transmitted over an optical communication link by modulating an optical carrier at a line rate of the link, typically above 100 Mb/s. The terms 'low-speed', 'low-frequency', 'low [data] rate' refer to data and/or signals that are transmitted by modulating an optical carrier at a rate or frequency that is at least an order of magnitude lower than the line rate, and typically below 50 Mb/s or below 50 MHz. The term 'service data' refers to data that is generated and transmitted for the benefit of the optical communication system itself rather than its users, such as data related to system and/or transceiver configuration, diagnostic and maintenance. The term 'transceiver' as used herein refers to a device that incorporates a receiver and a transmitter, and encompasses transducers. The term 'node' as used herein refers to a connection point of a transmitter, a receiver, or a transceiver in an optical communication system and encompasses a termination point of an optical communication link.

Note that as used herein, the terms "first", "second" and so forth are not intended to imply sequential ordering, but rather are intended to distinguish one element from another unless explicitly stated otherwise. The terms 'coupled' and 'connected' as used herein may mean either a direct connection or coupling, or an indirect connection or coupling with one or more interviewing elements or devices, unless specifically stated otherwise. Furthermore, the following abbreviations may be used:

ASIC Application Specific Integrated Circuit
FPGA Field Programmable Gate Array
BPSK Binary Phase Shift Keying
QPSK Quadrature Phase Shift Keying
QAM Quadrature Amplitude Modulation
SPI Serial Peripheral Interface (Bus)
ADC Analog to Digital Converter
DAC Digital to Analog Converter
WDM Wavelength Division Multiplexing, encompasses DWDM
DWDM Dense Wavelength Division Multiplexing
SOA Semiconductor Optical Amplifier
PD Photodetector
LO Local Oscillator
DSP Digital Signal Processor
SERDES Serializer/Deserializer Coherent receivers are capable of accepting multiple incoming transmission channels simultaneously and, by tuning of the wavelength of a local oscillator laser in the receiver, selecting one of these channels for demodulation and reception. One aspect of the present invention provides a tunable coherent receiver that can quickly, in a manner of milliseconds or less, detect all optical channels that are present in the received optical signal, and therefore can be quickly auto-configured to tune to a desired received channel. This is enabled by modulating optical signal in each optical channel with a unique trace tone, which can be done at transmission or anywhere in the network downstream from the transmitter where the channel is de-multiplexed, and then using the trace tones at the receiver to electronically detect which channels are present in the received light.

Figure 1:
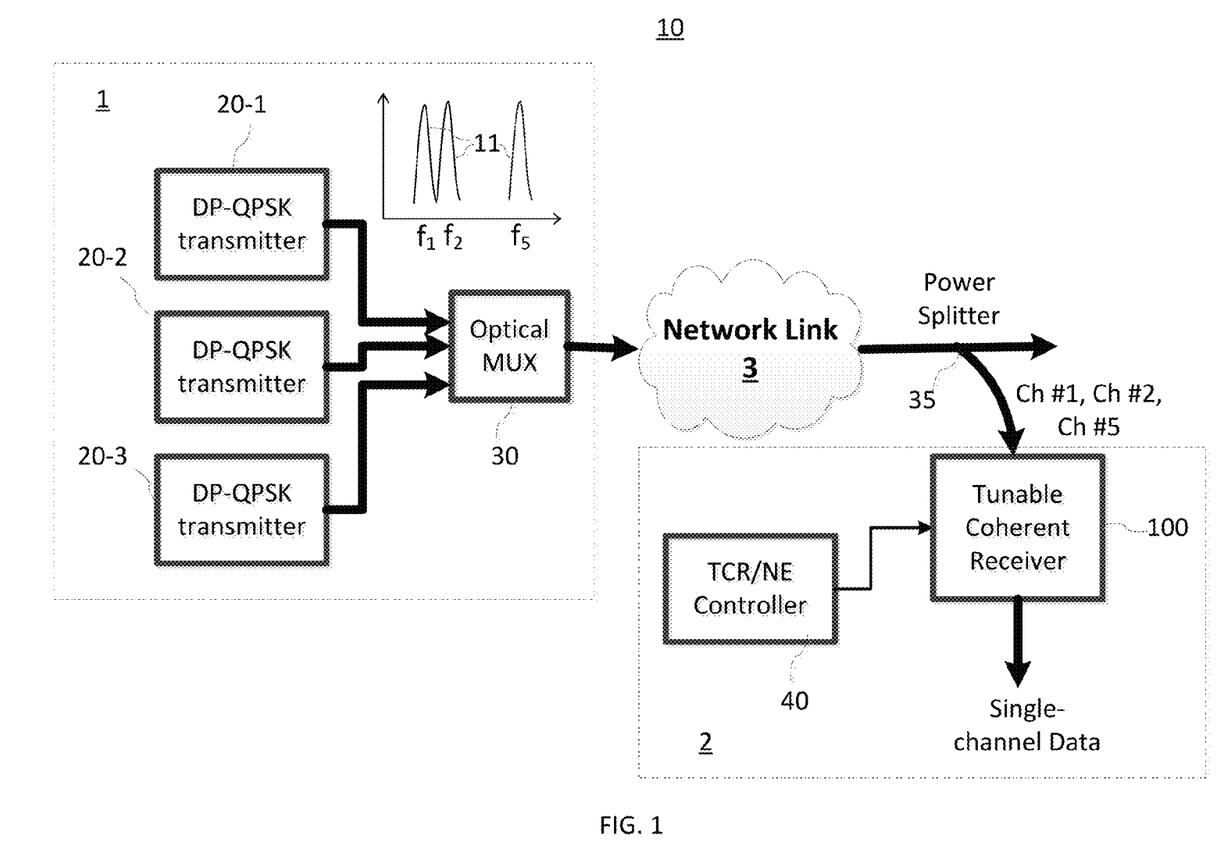
FIG. 1 is a schematic diagram illustrating an optical communication link utilizing trace tone modulation and a tunable coherent receiver.

With reference to FIG. 1, there is schematically illustrated an exemplary portion of a fiber-optic DWDM network 10 utilizing features of the present invention. The illustrated network portion includes first and second optical nodes 1, 2 that are connected by an optical link 3, which is shown schematically as a cloud and which may include intermediate optical devices and systems such as intermediate pass-through nodes, optical amplifiers, optical routers, optical add/drop multiplexers, and the like. Node 1 includes optical transmitters (Tx) 20-1, 20-2 and 20-3, which are generally referred to herein as transmitters 20 or Tx 20, while node 2 includes a tunable coherent receiver (TCR) 100, which may receive optical signals generated by the transmitters 20, and which includes features of the present invention as described hereinbelow more in detail. It will be appreciated that each of the transmitters 20 at node 1 and the TCR 100 at node 2 may be a part of a corresponding optical transceiver that also includes a complimentary optical receiver or transmitter so as to support bi-directional communications between nodes 1 and 2 as known in the art.

Each of the optical transmitters 20 is configured to generate an optical signal at a wavelength corresponding to a particular optical channel, with a unique trace tone embedded therein in accordance with an embodiment of the present invention. Each transmitter 20 has an output optical port coupled to one of input ports of an optical multiplexer 30. By way of example, transmitters 20 may be DP-QPSK transmitters that may further be tunable to transmit optical signals at any optical channels from a plurality of optical DWDM channels on a 100 GHz ITU grid or any other suitable wavelength grid as known in the art, and which are adapted for embedding trace tones in their output optical signals. In one embodiment, these trace-tones are substantially low-frequency harmonic tones, each having a frequency that is selected from a pre-defined set of base frequencies $f_i$ and is uniquely associated with the wavelength of the corresponding optical channel. In the context of this specification, the terms 'base frequency' and 'trace tone frequency' may be used interchangeably, with the term 'base frequency' also used to refer to any trace tone frequency that is defined for a particular system. In one embodiment, these trace tones, which may also be referred to herein as the channel ID tones, may carry useful data, for example related to node-to-node communications for the purpose of network support, and be low-frequency and narrow-bandwidth signals. Other embodiments include non-tunable transmitters for operating on specific optical channels, as well as optical transmitters that employ other modulation formats that are amenable to coherent detection. Further by way of example only, transmitters 20-1, 20-2 and 20-3 may be configured, or tuned, for operation on the DWDM channels Ch. #1, Ch #2, and Ch #5, respectfully, which may correspond, for example, to optical channel frequencies 191.100 THz (terahertz), 196.200 THz and 196.500 THz, or to any other optical channel frequencies that may be used in a particular communication system.

In operation, light emitted by each of these Tx 20 is broad-band modulated to transmit user data between nodes 1 and 2 at a high line rate, such as 40 Gb/s, 100 Gb/s or beyond. Additionally, in accordance with an embodiment of the present invention the optical output of each of these transceivers is further modulated, such as in intensity, with the corresponding channel ID tone having a base frequency $f_i$ that is low relative to the line rate; these sub-carrier tones are schematically represented in FIG. 1 by spectral peaks 11, and will be generally referred to herein as trace tones 11, channel ID tones 11, or simply tones 11.

The trace tone frequencies $f_i$, i=1, . . . , N, may be uniformly or non-uniformly spaced. In one embodiment the tones 11 are uniformly spaced in frequency by a frequency spacing $\Delta f$, which is selected to enable clear discrimination between different tones at the receiver using relatively simple electronics. By way of example, $\Delta f$ may be about 10 kHz or greater, and the tones may occupy a frequency range from about 100 kHz or less to about 1500 kHz, enabling more than 100 unique channel ID tones. The tone frequency $f_i$ used at each transmitter 20 corresponds to the DWMD channel it is tuned to, and uniquely defines this channel in at least a portion of the network to which both the transmitters 20 and the TCR 100 belong.

Figure 2:
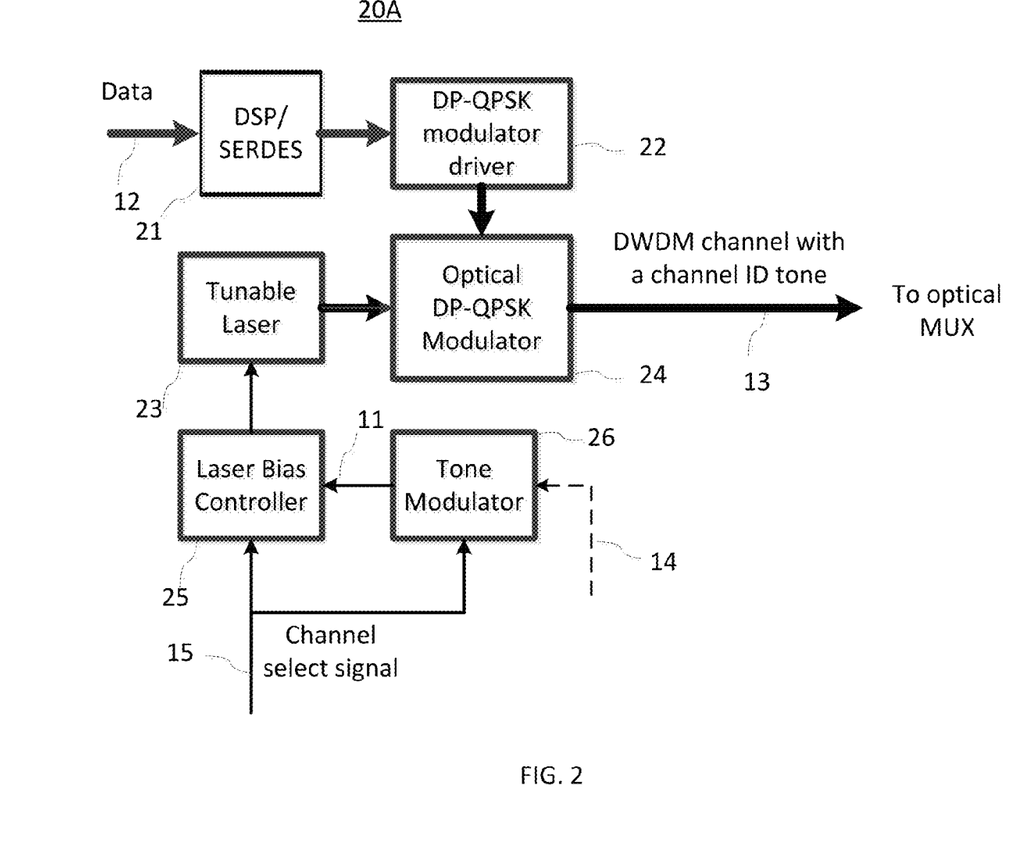
FIG. 2 is a general block diagram of an optical transmitter utilizing trace tone modulation.

With reference to FIG. 2, there is schematically illustrated an exemplary transmitter 20A, which could be used to implement transmitters 20 in an embodiment of the invention. The transmitter 20A has a high-speed data interface for receiving high-speed electrical data streams 12 from a host controller (not shown) and an optical output port for generating an optical channel signal 13 that is modulated using a selected modulation format, such as DP-QPSKA by way of example. The transmitter 20A further has a control interface, which may be configured to receive a "channel select" signal 15, if the transmitter 20A is tunable. The transmitter 20A includes an optical source 23, such as a tunable semiconductor laser, which optical output connects to an optical DP-QPSK modulator 24. The modulator 24 is electrically driven by a DP-QPSK modulator driver 22, which in turn receives its input from a SERDES 21. The SERDES 21 converts the electrical data signals 12 received from the host controller into electrical signals suitable for the chosen modulation format. In one embodiment, SERDES 21 converts input data streams into electrical I and Q signals for each of the two polarizations of the output light, for a total of four signals as known in the art for the DP-QPSK modulation.

A bias controller 25 that connects to an electrical input of the optical source 23 is for controlling a bias voltage or current of the optical source 23 as known in the art. The optical source 23 may be embodied using a tunable semiconductor laser, which may include multiple sections that are individually electrically biased, such as a gain section, a tuning section and, optionally, an amplification section, in which case the bias controller 25 is configured to generate bias signals for each of these sections, as also known in the art. A tone modulator 26 is further provided that connects to the bias controller 25 for modulating the electrical bias signal of the laser 23 with a trace tone signal at a selected trace tone frequency, which results in the desired trace tone modulation of the optical output of the laser 23 described hereinabove. In different embodiments, the tone modulator 26 may modulate either the gain section of the laser 25 or, more preferably, the amplification section thereof, so as to modulate the output optical power of the laser 23 with the selected tone signal. In one embodiment, the tone modulator 26 may have a data input for receiving service data 14 for transmitting over the trace tone. In one embodiment, the channel select signal 15 from the host controller is provided to both the laser bias controller 25 for setting the wavelength of the laser 23 to a selected optical channel, and to the tone modulator 26 for setting the trace tone frequency to correspond to the selected optical channel. In one embodiment the tone modulator includes memory storing a look-up table specifying unique trace tone frequencies for each possible optical channel to which the laser 23 can be tuned to. In another embodiment, the bias controller may 25 be adopted to modulate an optical attenuator (not shown) that is disposed downstream from the optical source 23, thereby providing the desired trace tone modulation of the output optical channel 13.

In one embodiment, trace tones 11 may be narrow-band modulated using a suitable modulation format, such as BPSK or BFSK encoding, for example to carry service data between the nodes, thereby enabling inter-node signaling. In the context of this specification, the term 'service data' refers to data that relates to the network configuration, maintenance and diagnostics, including data related to the configuration, maintenance and diagnostics of the transmitters and receivers themselves. By way of example, service data may include data related to transceiver control information, such as a command to change the optical frequency or transmission power of the tunable transceiver, and transceiver digital diagnostics information, such as data related to device temperature, receiver power, laser temperature, and the like.

Referring now back to FIG. 1, node 1 utilizes the optical multiplexer (MUX) 30 to combine optical outputs of the transmitters 20 for launching into the network 3 over a single optical fiber. However, node 2 uses a simple power splitter 35, instead of a more traditional optical demultiplexer, to direct an optical signal received from the network link 3 to the TCR 100. Therefore the optical signal received by the TCR 100 may include one or more of the channels generated by the transmitters 20, and may further optionally receive other optical channels generated at other nodes in the network 10. The TCR 100 then utilizes trace tone detection for the discovery of received optical channels, and uses this information, possibly with the assistance from a node controller, to tune to a desired received channel. Note that in other embodiments, MUX 30 may be substituted with a non-selective beam combiner if the power budget of the system allows it, in which case the optical transmission between the nodes 1 and 2 can be made substantially "colorless".

Figure 3:
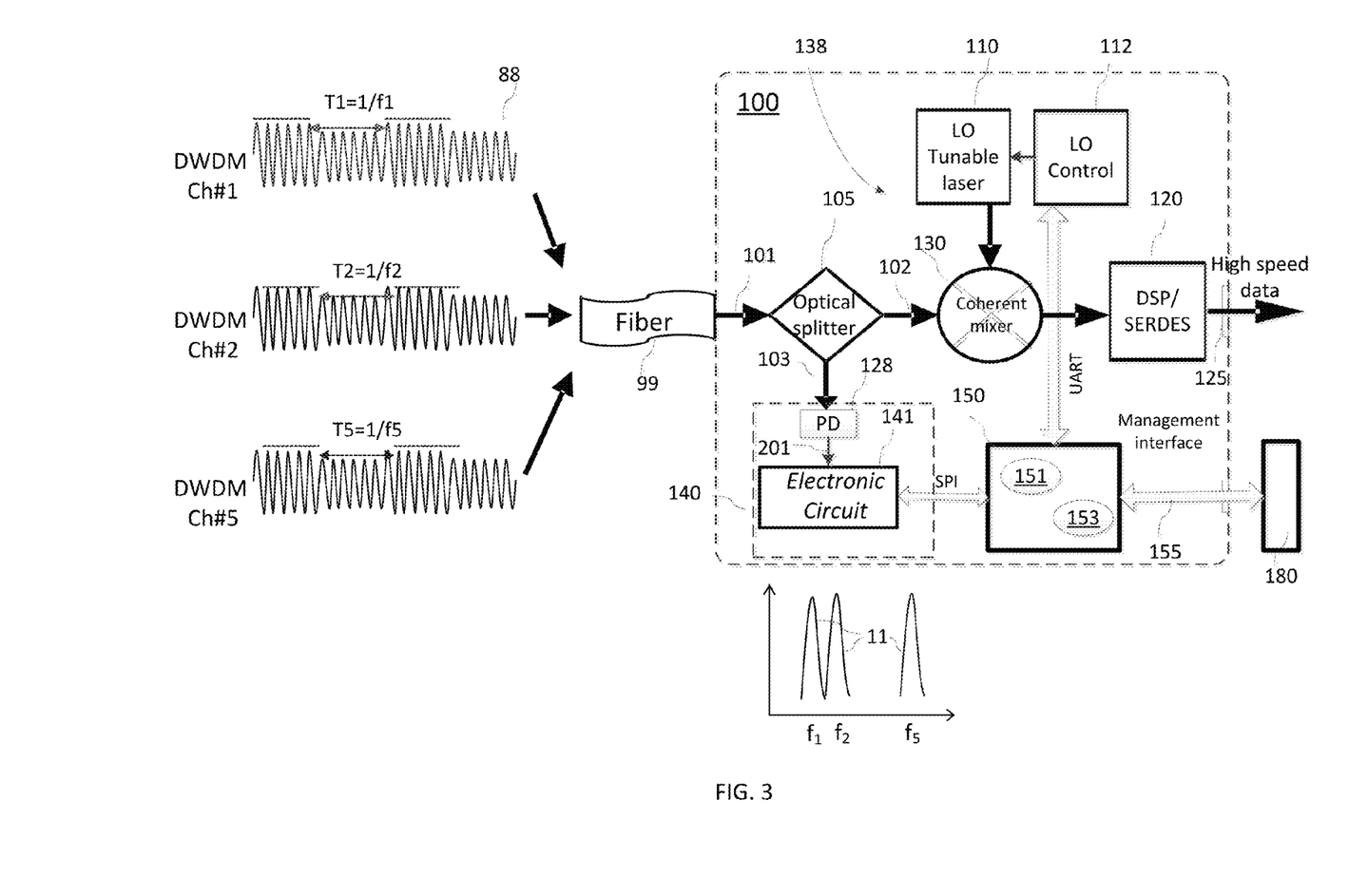
FIG. 3 is a schematic block diagram of a tunable coherent receiver utilizing trace tone detection for self-tuning or external tuning.

With reference to FIG. 3, there is illustrated a schematic block diagram of the TCR 100 in accordance with an embodiment of the present invention. It includes a fiber-optical port 99, which receives an optical WDM signal 101 from the network 10, a control interface 155, and a high-speed data output port 125 for outputting demodulated high-speed data. The received optical WDM signal 101 may include one or more optical channels 88, each of which modulated with its own trace tone 11, and the high-speed data output port 125 outputs the electrical data signals demodulated from a selected received optical channel. The fiber-optic port 99 connects to an input optical power splitter 105, or an optical tap, which splits the received optical signal 101 into first and second optical signal portions 102 and 103, respectively, without substantially changing its optical spectrum. The first portion 102 is then directed to an optoelectronic coherent detection/demodulation circuit (CDC) 138 formed by a coherent mixer/detector 130 and a tunable local oscillator (LO) laser 110, while the second optical signal portion 103 is directed to an optoelectronic trace tone detection circuit (TTDC) 140. The splitting ratio of the optical splitter 105 is preferably selected for directing most of the optical power of the received optical signal 101 into the coherent mixer/detector 130, with a small fraction of the optical signal power, for example 1 to 10% and preferably 1 to 5%, tapped off and directed to the trace tone detection circuit 140.

Figure 12:
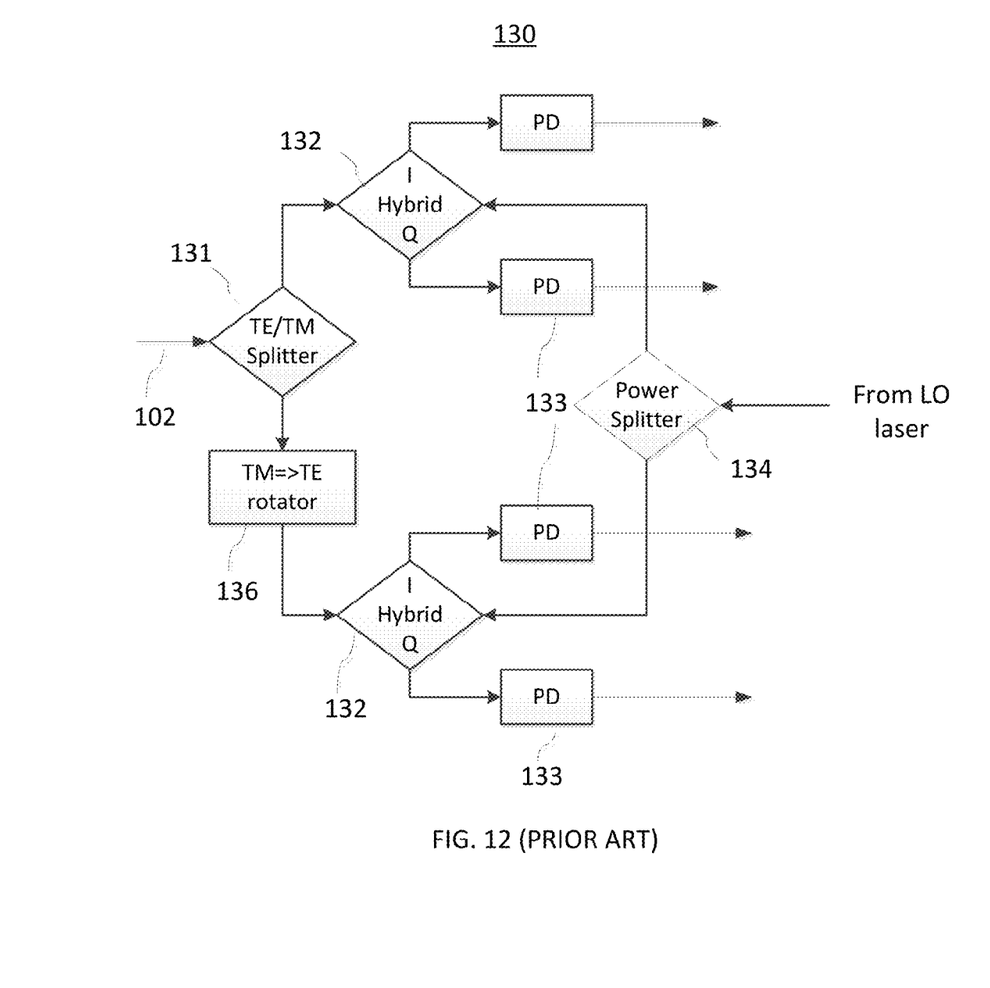
FIG. 12 is a schematic block diagram of a coherent mixer/detector for DP-QPSK signals.

In operation, the CDC 138 selectively demodulates one of the WDM optical channels present in the received optical signal 101 and extracts therefrom the high-speed data signal using a suitable coherent detection technique known in the art. The selection of the optical channel to demodulate is performed by tuning the output wavelength of the LO source 110, which may be for example in the form of a tunable semiconductor laser having a suitably narrow spectral linewidth. By way of example, the LO source 110 may be embodied using a photonic integrated circuit (PIC) transmitter which incorporates a widely-tunable semiconductor laser and a SOA section in a same chip, as described for example in an article "Widely tunable DS-DBR laser with monolithically integrated SOA: design and performance" published in Selected Topics in Quantum Electronics, IEEE Journal of (Volume: 11, Issue: 1), January 2005 by Ward, A. J. and et al. The output wavelength of the LO laser 110 is controlled by a bias voltage or current, or a set of different bias voltages or currents, applied to a wavelength-control terminal thereof, or to two or more terminals thereof. An LO controller 112 is further provided, which generates the bias voltages that are required for tuning the output wavelength of the LO laser 110 to the desired optical channel in response to receiving a channel select signal over its communication interface. The LO controller 112 may store wavelength control information, such as a look-up table, which relates the LO laser bias voltages or currents to particular optical channels. An exemplary architecture of the coherent mixer/detector 130 for the DP-QPSK modulation format is illustrated in FIG. 12 and described hereinbelow. High-speed electrical data signals from the output of the coherent mixer/detector 130 may be first passed to an optional DSP/SERDES 120 for signal conditioning and/or converting into a desired output format as known in the art, and are outputted via the high-speed output port 125.

The TTDC 140 includes an auxiliary photodetector (PD) 128, which converts the second optical signal portion 103 into an electrical PD signal 201 and provides it to an electronic trace detector (ETD) 141. The ETD 141 is configured to analyze the PD current from the PD 128 for the presence of one or more trace tones therein, and to generate a trace detection signal, which carries trace presence information identifying the one or more low-frequency trace tones 11 that are present in the received optical signal 101.

By way of example, the TCR 100 may receive an optical signal that includes three WDM channels 88, labeled as Ch#1, Ch#2, and Ch#3 in FIG. 3, each of which is modulated by its respective trace tone 11 at the corresponding base frequencies $f_1$, $f_2$ and $f_5$. This effectively results in the modulation of the optical intensity and power of the received optical signal 101 at these base frequencies, so that the low-frequency spectrum of the received optical signal 101 looks generally as shown by the insert at the bottom of FIG. 3. ETD 141 detects the presence of these base frequencies, and outputs a trace detection signal from which the base frequencies $f_1$, $f_2$ and $f_5$ that are present in the input signal 101 can be identified.

In one embodiment wherein the TCR 100 includes an internal micro-controller (IMC) 150, this trace detection signal is passed to the IMC 150, for example via a suitable digital interface such as a serial bus, and/or may also be passed to an external controller (EC) 180, such as a network or node controller, via the control interface 155. The IMC 150 may be embodied, for example, using a suitable microprocessor, an PLD (Programmable logic device), an FPGA, an ASIC, or any combination thereof. In one embodiment, the ETD 141 is configured to probe, for example step or scan through, a plurality of trace tone frequencies corresponding to a plurality of optical WDM channels that may be received by the TCR 100, for detecting their presence in the received optical signal 101. In one embodiment, the TTDC 140 may also include a suitable decoder for decoding messages from a transmitting network controller at node 1 that may be carried by the selected trace tone.

FIG. 12 illustrates an exemplary architecture of the coherent mixer/detector 130 of FIG. 3 for coherently detecting the DP-QPSK signal as known in the art. The main portion 102 of the input optical signal 101 is received into the TE/TM splitter 131, which provides the TE polarized portion of the received optical signal into one of two I/Q hybrid mixers 132 to start the TE branch of demodulation. The TE/TM splitter 401 also provides the TM polarized portion of the TE polarized optical signal to the TM to TE rotator 136, which rotates the polarization of that optical signal to TE polarization, and passes it to the second I/Q hybrid mixer 132 to start the TM branch of modulation. The TE and TM polarization optical signals are mixed in two respective I/Q Hybrids 132 with the CW optical signal provided by the LO laser 110 via a power splitter 134, with the wavelength of the cw controlled by the LO Controller 112. Each of the resulting four mixed optical signals is then provided to a corresponding high-speed photodetector (PD) 133. Electrical PD signals from the PDs 133 may then be optionally adjusted to a normalized level by variable gain amplifiers (not shown), and subjected to clock recovery in the DSP/SERDES 120 to obtain four high-speed electrical data signals TE-I, TE-Q, TM-I and TM-Q as known in the art, which may then be provided in a desired serial or parallel form to the host controller (not shown) via the high-speed interface 125. Alternatively, the clock recovery and gain control functions may be performed by the host controller.

Figure 4A:
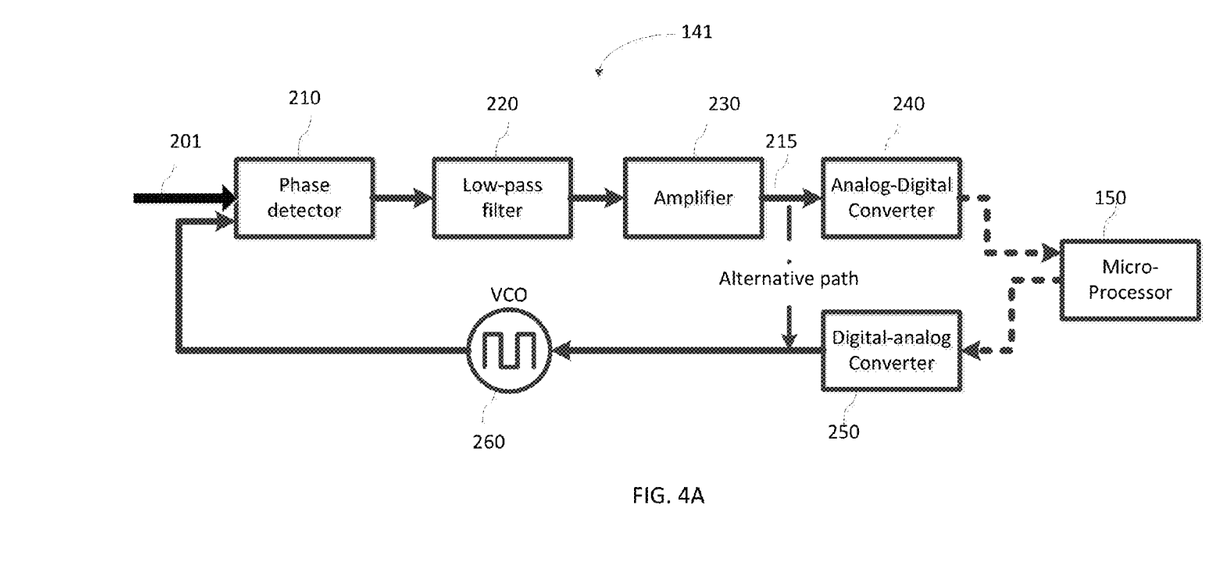
FIGS. 4A and 4B are schematic block diagrams of two exemplary embodiments of an electronic trace detector.

Referring now to FIG. 4A, the ETD 141 may be implemented, for example, as a phase lock loop (PLL) for detecting the trace tones in cooperation with the IMC 150. An electrical PD signal 201 from the PD 128 is sequentially passed through a phase detector 210, a low-pass filter 220, and an optional amplifier 230. A feedback path includes a voltage-controlled oscillator (VCO) 260 that generates a periodic signal which frequency may be controlled by the IMC 150 though a DAC 250. In operation IMC 150 sets the VCO frequency to a desired base frequency and monitors the output of the low pass filter 220, which in this embodiment constitutes the trace detection signal, through an analog-digital converter (ADC) 240 to determine whether an optical channel that is associated with the currently-probed base frequency is present. This process may be repeated for a plurality of base frequencies until the entire trace tone frequency range, or a desired portion thereof, is scanned. An alternative and all-analog path could be chosen to speed up the lock time as necessary. The IMC 150 determines the presence or absence of trace tones in the PD signal 201 by the presence or absence of PLL locking, as determined from the output of the amplifier 230 or the low-pass filter 220.

Once the VCO frequency is set to a particular base frequency, the phase detector 210 compares the PD signal 201 at its input with the output signal from VCO 260, and produces an error signal which is proportional to their phase difference. The error signal is then low-pass filtered and amplified as required, and then used to adjust the phase and/or frequency of the reference signal from the VCO 260 producing a negative feedback loop, either through the IMC 150 or directly from the output of the amplifier 230 to speed-up the locking process. If the output phase of the VCO drifts with respect to the input phase of the PD signal, the error signal 215 will increase, generally driving the VCO phase in the opposite direction so as to reduce the error. If the PD signal 201 includes a trace tone with frequency that is within the PLL locking range from the output frequency of the VCO 260, the output phase of the VCO 260 will get locked to the phase of the input signal 201, reducing the error signal 215 from the amplifier 240 to a near-zero level. The microprocessor 150 monitors the digitized error signal 215, and detects the presence or absence of a particular tone frequency in the PD signal 201 by the presence or absence of the PLL locking.

It will be appreciated that the PLL circuit of FIG. 4A may be implemented using either analog or digital elements or a combination thereof. Analog phase locked loops are generally built with an analog phase detector, low pass filter and VCO placed in a negative feedback configuration. A digital phase locked loop uses a digital phase detector; it may also have a divider in the feedback path or in the reference path, or both, in order to make the PLL's output signal frequency a rational multiple of the reference frequency. A non-integer multiple of the reference frequency can also be created by replacing the simple divide-by-N counter in the feedback path with a programmable pulse swallowing counter.

Figure 4B:
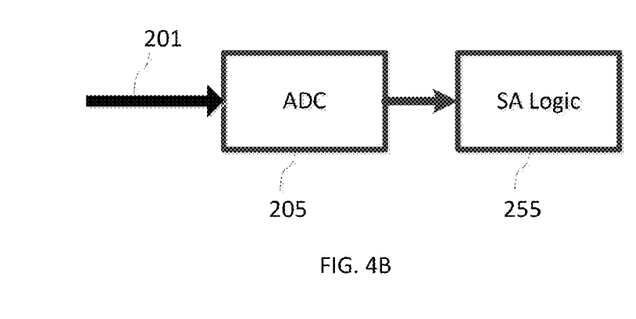

It will be appreciated that ETD 141 may also be embodied using other spectral analyzing circuits that are suitable for detecting the presence of the low-frequency trace tones 11 in the PD signal 201. For example, the trace tones may be detected using digital signal processing techniques. In one embodiment illustrated in FIG. 4B, PD signal 201 is sampled with a high-resolution and a relatively high-speed ADC (analog to digital converter) 205. The sampling rate should be at least twice higher than the highest tone frequency, though 10 point sampling per tone period may be preferable. The digitized data from the output of the ADC 205 may then be processed by a digital spectrum analyzing logic 255, which may be for example implement a simple Fourier transform to convert the time-domain discrete signal from the ADC 205 into frequency-domain information, and one of known peak detection techniques and/or frequency-domain thresholding to determine the presence or absence of peaks at the one or more base frequencies to determine the presence or absence of any particular trace tone 11. Thus the presence of any base frequency could be determined without sweeping a VCO input to scan entire frequency range. The digital signal processing exemplified by block 255 could be done with a micro-processor, CPLD, FGPA or ASIC, and may be implemented within the IMC 150.

In one embodiment, the IMC 150 may be configured to send the trace presence information to the external controller (EC) 180 via the control interface 155. The EC 180 then uses this information to select between the received WDM channels to which the receiver 100 should be tuned to, and to pass a corresponding channel select signal, which identifies the selected optical channel, to the LO controller 112, either directly or through the IMC 150. The LO controller 112 then tunes the LO signal to the selected optical channel. In one embodiment, the IMC 150 may implement hardware or software logic 151 for selecting the selected optical WDM channel based on the trace presence signal received from or using the ETD 141, and to generate the corresponding channel select signal to the LOC controller 112. In one embodiment the IMC 150 includes channel look-up memory 153 storing a look-up table relating possible base frequencies to optical channels.

Figure 5:
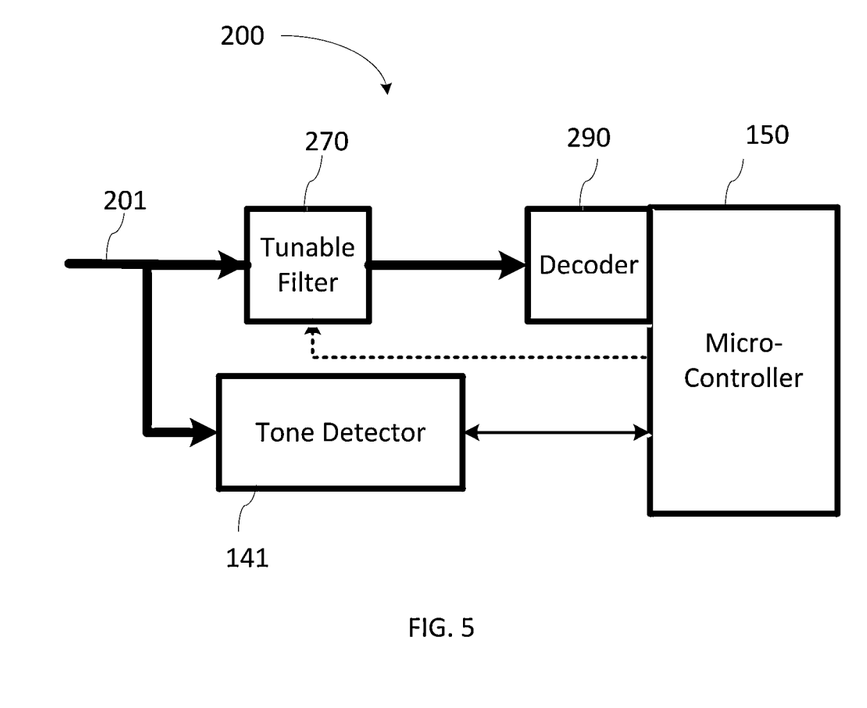
FIG. 5 is a schematic block diagram of a trace tone processing circuit including a trace tone decoder.

With reference to FIG. 5, there is schematically illustrated an embodiment wherein the TTDC 140 includes, in addition to the electronic tone detector 141, a trace tone demodulation/decoding circuit 200, which may be implemented when one or more of the received trace tones 11 are modulated at the transmitter to carry useful data, such as transmitter-generated service messages, for example for the purpose of network monitoring and configuration. Functionally, the trace tone demodulation/decoding circuit 200 may include a tunable filter 270 for selecting a desired trace tone, followed by a trace tone decoder 290 that is configured to decode transmitter-generated messages carried by the selected trace tone. It will be appreciated that the functionality of the tunable filter 270 may be implemented using a variety of known techniques, including but not limited to using a VCO and/or digital signal processing. A variety of modulation formats may be used to modulate the trace tone, including but not limited to BPSK and BFSK.

Figure 6:
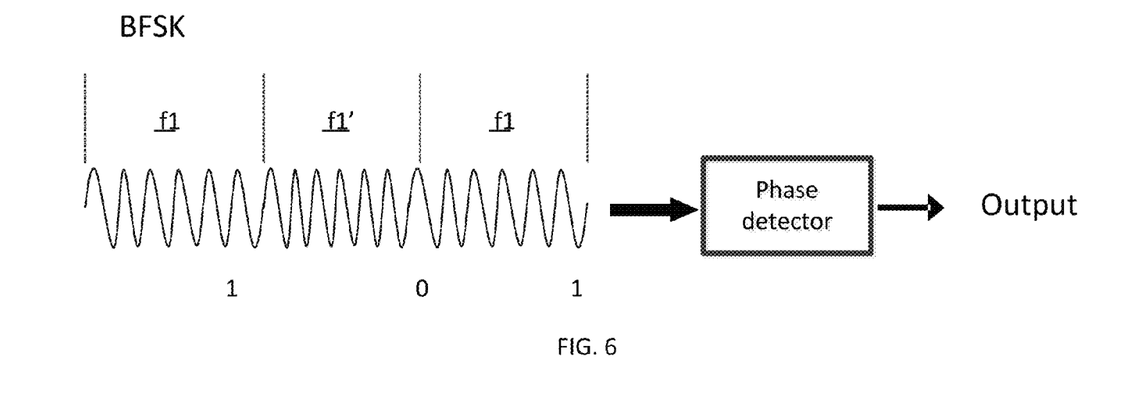
FIG. 6 is a schematic diagram illustrating a BFSK decoder for service data decoding
Figure 7:
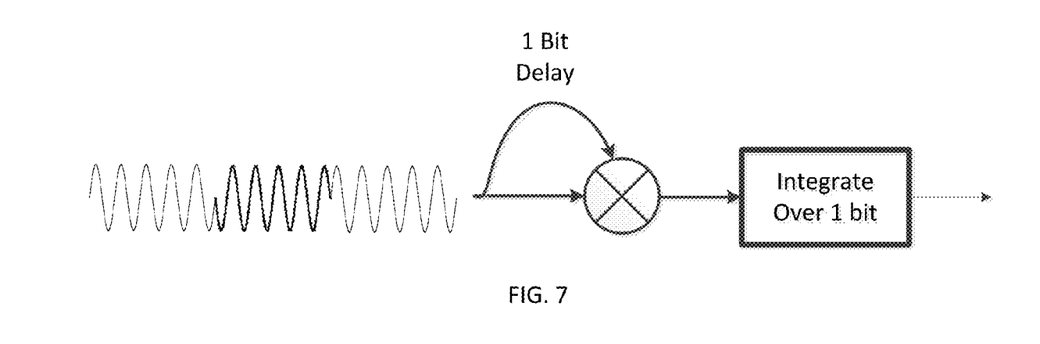
FIG. 7 is a schematic diagram illustrating a BPSK decoder for service data decoding.

By way of example, FIG. 6 illustrates a BFSK modulated trace tone signal wherein logical "0" is transmitted by changing the tone frequency from the base frequency f1 to a slightly different frequency f1'. The de-coder 290 maybe then implemented using a simple phase detector as known in the art. The magnitude of the frequency modulation |f1-f1'| should be selected to be smaller than the trace tone spacing $\Delta f$. FIG. 7 illustrates a BPSK modulated trace tone signal wherein the phase of the trace tone signal is changed by $\pi$ at each transition between logical "0" and "1". The decoder 290 may then be implemented using, for example, a one-bit delay followed by a mixer and an one-bit integrator as known in the art. Of course, other modulation formats including ASK, QPSK, etc., can also be used to modulate the trace tones. It will be appreciated that each of the blocks 270 and 290 may be implemented using analog or digital circuitry, for example using a digital processor preceded by an ADC, and one or both of these blocks may be implemented within the IMC 150, using ADC 205 to digitize the PD signal 201.

According to an aspect of the present invention, TCR 100 implements a method for operating a tunable coherent receiver such as TCR 100, or an optical link comprising the TCR, in a WDM system comprising a plurality of optical transmitters for transmitting a plurality of optical WDM channels carrying high-speed data signals. The method may include the following general steps: modulating each of the optical WDM channels with a unique low-frequency trace tone 11, for example as described hereinabove with reference to FIGS. 1 and 2, and performing at the coherent receiver the steps of:

a) splitting a received optical signal comprising one or more of the optical WDM channels into first and second optical signal portions;

b) directing a first optical signal portion to a coherent detection & demodulation circuit (CDC) comprising a tunable local oscillator (LO) source of an optical LO signal;

c) directing a first optical signal portion to a trace tone detection circuit (TTDC) for detecting the presence of one or more low-frequency tones therein;

d) using information about the one or more trace tones present in the received optical signal to identify the one or more received optical channels, and to select one of the received optical channels therefrom;

e) tuning the LO source to the selected optical channel; and,     f) mixing the LO optical signal with the second optical signal portion for coherently de-modulating the selected optical channel.

Various features of this method that may be implemented by the TCR 100 in exemplary embodiments thereof will now be described with reference to FIGS. 8-11.

Figure 8:
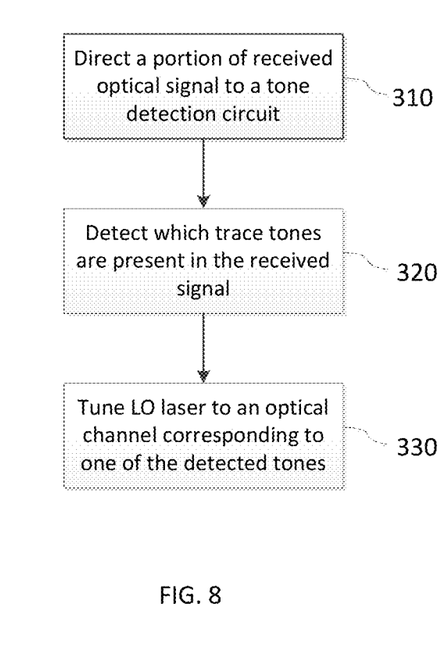
FIG. 8-11 are flowchart illustrating various embodiments of the method of operating the tunable coherent receiver of FIG. 3.

Turning first to FIG. 8, TCR 100 may implement the following general steps of the method in one embodiment thereof. As the optical signal 101 is received from the network link 3, a tapped off portion 103 of the received optical signal is directed to the trace tone detection circuit 140 at step 310. At step 320, the trace tone detection circuit performs operations to detect one or more trace tones that are present in the input optical signal 101, which as described hereinabove involves converting the tapped-off portion of the input signal into an electrical signal and may further involve scanning or stepping through a range of pre-defined trace tone frequencies to check for the presence of trace tones. Once one or more trace tones are detected, at step 330 the LO laser 110 is tuned to an optical channel that corresponds to one of the one or more detected trace tones. This may include monitoring the output signal of the trace detection circuit by the IMC 150 to discern the trace presence information therefrom so as to identify all or at least some of the trace tones 11 that are present in the received optical signal 101.

Figure 9:
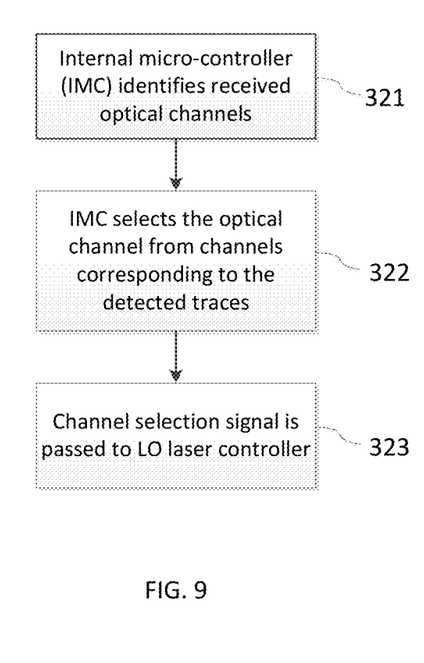
Figure 10:
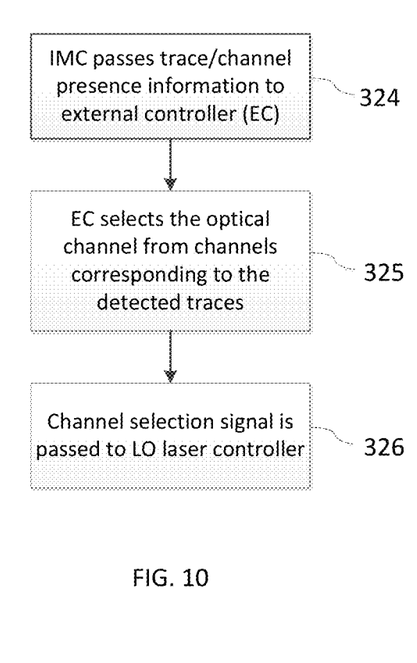

Referring now to FIGS. 9 and 10, in various embodiments the decision as to which optical channel to tune the LO laser 110 may be made either by the IMC 150 itself or by the EC 180 based on the trace presence information.

Turning first to FIG. 9, in one embodiment the suitably programmed IMC 150 identifies at 321 which one or more optical channels is/are received with the optical signal 101 based on the trace presence signals from the EDC 141. For that purpose, the IMC 150 may store information relating optical channels to trace tones, for example in the form of a look-up table 153. At 322, the channel selection logic 151 of the IMC 150 selects one optical channel from the one or more identified received channels corresponding to the one or more detected traces 11, and sends a channel selection signal to the LO controller 112, which in response generates a suitable bias signal to tune the LO laser 110 to the selected optical channel at step 323.

Turning now to FIG. 10, in another embodiment the IMC 150 passes trace or channel presence information to the external controller (EC) 180 at step 324, and the EC 180 uses this information at 325 to select the desired optical channel for the LO to tune to from channels corresponding to the detected traces. The EC 180 then sends a channel selection signal to the LO controller 112 either directly or via the IMC 150 at step 326, which in response generates a suitable bias signal to tune the LO laser 110 to the selected optical channel at step 323.

In some embodiments, the IMC 150 may be programmed or otherwise fitted with the channel selection logic 151 that enables the TCR 100 to auto-configure itself based on the received optical signal 101, for example at the system startup, when the receiver is added, or during normal operation when the channel content of the received optical signal is changed.

Figure 11:
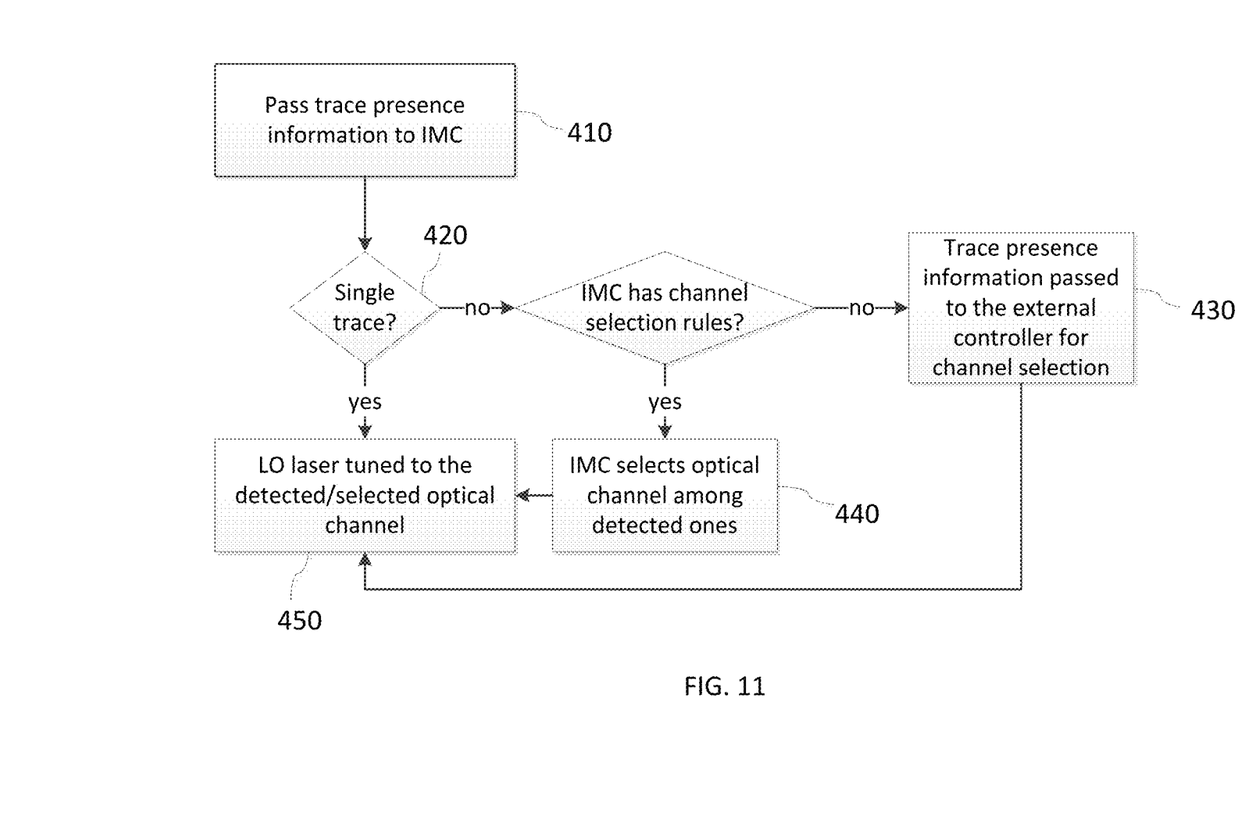

With reference to FIG. 11, there is illustrated a flow-chart of the TCR operation in one such embodiment. The processing starts at step 420, wherein the trace presence information generated by the ETDC 141 is received by the IMC 150. As described hereinabove, the trace presence information may be contained, for example, in the phase/frequency error signal at the output of the PLL, which may be monitored by the IMC 150, or may be in the form of digital messages from the SA logic 255 identifying which base frequencies are present in the received signal. If only a single trace tone has been detected signifying the presence of a single optical channel in the received optical signal 101, the IMC 150 may then immediately turn to step 450 to direct the LO controller 112 to tune the LO laser 110 to the received optical channel. If at step 420 the presence of two or more trace tones 11 is identified, further TCR operation may depend on whether the IMC 150 has, i.e. is programmed with, logic 151 including rules pertaining to optical channel selection. Such rules may, for example, include rules pertaining to channel priority, wherein different optical channels that may potentially be received by the TCR are assigned different priorities, and the IMC selects the received channel with a highest assigned channel priority compared to other received channels. If the IMC has no channel selection rules, the channel or trace presence information is passed at 430 to the EC 180 for selecting among the received channels. If IMC 150 is programmed with an applicable channel selection algorithm (channel selection logic 151), IMC 150 uses it at step 440 to select one of the received channels, and then in step 450 directs the LO controller 112 to tune the LO laser 110 to the selected optical channel.

The aforedescribed tunable coherent receiver is capable of stepping through many trace frequencies in a few milliseconds, which advantageously compares to seconds typically needed to tune the wavelength of the tunable LO laser from one optical channel to another, thereby considerably reducing the receiver configuration time. Furthermore, the same trace tones used as channel IDs may also be used to carry useful data, thereby enabling for example communications and management to a remote transceiver or transponder module on a remote host system with no out of band OSC (Optical Supervisory Channel) access.

Although the invention has been described with reference to specific exemplary embodiments, it is not limited thereto, and various modifications and improvements within the scope of the present invention may become apparent to a skilled practitioner based on the present description. For example, although the exemplary embodiments described hereinabove have been described with reference to DWDM networks, the invention is not limited thereto and is applicable to other optical communication systems, including single optical links between two terminals or nodes. Furthermore, embodiments can be envisioned wherein each optical channel is associated with two or more trace tones, or sub-carriers, for example in order to increase the amount of data that may be transmitted over the trace tones, as long each trace tone is associated at the receiver with a single optical channel. Furthermore, the invention is not limited to the DP-QPSK modulation format, but encompasses communication systems and optical receivers using other suitable modulation formats, including but not limited to different version of ASK (amplitude shift keying), QAM, FSK (frequency shift keying), and higher-order PSK modulation, provided that a coherent detection with a tunable LO source is used at the receiver. Furthermore, each of the embodiments described hereinabove may utilize a portion of another embodiment. Of course numerous other embodiments may be envisioned without departing from the spirit and scope of the invention.

I claim:

1. A tunable coherent optical receiver comprising:
   an optical splitter for splitting a received optical wavelength-division multiplexing (WDM) signal into first and second optical signal portions,
      the received optical WDM signal comprising one or more optical channels carrying high-speed data signals,
         each of the one or more optical channels being modulated with a low-frequency trace tone uniquely associated with each optical channel of the one or more optical channels;
   a coherent detection/demodulation circuit (CDC) coupled to the optical splitter for receiving the first optical signal portion and for selectively and coherently demodulating a high-speed data signal, of the high-speed data signals, from one of the one or more optical channels,
      the CDC comprising a tunable local oscillator (LO) source of an optical LO signal;
   a trace tone detection circuit (TTDC) coupled to the optical splitter for receiving the second optical signal portion and adapted for detecting a presence of a plurality of low-frequency trace tones and for generating a trace detection signal identifying a respective low-frequency trace tone of the plurality of low-frequency trace tones that are present in the second optical signal,
      the TTDC comprising a tunable filter for selecting a particular low-frequency trace tone, of the plurality of low-frequency trace tones, and a decoder for decoding transmitter-generated service messages carried by the plurality of low-frequency trace tones and comprising service data includes one or more of configuration, maintenance, or diagnostics information; and
   an LO control circuit coupled to the tunable LO source for tuning an optical frequency to a selected optical channel that is selected among the one or more optical channels present in the received optical WDM signal based on trace presence information.

2. The tunable coherent optical receiver of claim 1, wherein the TTDC comprises:
   a photo detector (PD) for converting the second optical signal portion into an electrical PD signal; and
   an electronic trace detector for probing the electrical PD signal at a plurality of trace tone frequencies corresponding to a plurality of optical channels for detecting their presence in the received optical WDM signal.

3. The tunable coherent optical receiver of claim 2, wherein the electronic trace detector comprises a phase lock loop (PLL) circuit.

4. The tunable coherent optical receiver of claim 2, wherein the electronic trace detector comprises an analog to digital converter and a digital spectrum analyzing logic.

5. The tunable coherent optical receiver of claim 1, wherein the decoder comprises a delay line, a mixer, and an integrator configured for decoding the plurality of low-frequency trace tones modulated using binary phase shift key (BPSK) encoding.

6. The tunable coherent optical receiver of claim 1, wherein the decoder comprises a phase detector configured for decoding the plurality of low-frequency trace tones modulated using frequency shift key (FSK) encoding.

7. The tunable coherent optical receiver of claim 1, further comprising:
   a control interface coupled to the TTDC and the LO controller for outputting trace tone presence information obtained from the TTDC to an external controller and for receiving, from the external controller, a channel selection signal for tuning the LO frequency to the selected optical channel.

8. The tunable coherent optical receiver of claim 1, further comprising:
   a micro-controller coupled to the LO control circuit for providing, to the LO control circuit, a channel selection signal for tuning the LO frequency to the selected optical channel.

9. The tunable coherent optical receiver of claim 8, wherein the micro-controller comprises hardware or software logic for selecting the selected optical channel based on the trace presence signal received from the TTDC.

10. The tunable coherent optical receiver of claim 1, wherein the CDC comprises:
    one or more optical mixers coupled to the optical splitter and the tunable LO source for mixing the LO signal with the first optical signal portion for producing one or more mixed optical signals; and
    one or more photodetectors for converting the one or more mixed optical signals into the high-speed data signal.

11. A method for operating a coherent receiver in a wavelength-division multiplexing (WDM) system comprising a plurality of optical transmitters for transmitting a plurality of optical channels carrying high-speed data signals, the plurality of optical transmitters being adapted to modulate each of the plurality of optical channels with a respective low-frequency trace tone, of a plurality of low-frequency trace tones, that is uniquely associated with each optical channel of the plurality of optical channels, wherein one or more of the plurality of low-frequency trace tones is modulated to carry messages comprising service data, the method comprising:
    modulating each of the plurality of optical channels with a low frequency trace tone that is uniquely associated with each optical channel of the plurality of optical channels, wherein one or more of the plurality of low frequency trace tones is modulated to carry the messages comprising service data;
    splitting, at the coherent receiver, a received WDM optical signal, comprising one or more of the plurality of optical channels, into first and second optical signal portions;
    directing a first optical signal portion to a coherent detection/demodulation circuit (CDC) comprising a tunable local oscillator (LO) source of an optical LO signal;
    directing a second optical signal portion to a trace tone detection circuit (TTDC) for detecting a presence of a plurality of low-frequency tones and selecting, using a tunable filter, a particular low-frequency trace tone of the plurality of low-frequency trace tones;

de-modulating one of the plurality of low frequency trace tones, detected by the TTDC, for extracting therefrom the messages comprising service data that includes one or more of configuration, maintenance, or diagnostics information of at least one of the system, the plurality of optical transmitters, or the coherent receiver;

using trace presence information about the plurality of low frequency trace tones present in the received WDM optical signal to identify the one or more of the of the plurality of optical channels and to select one of the identified one or more of the plurality of optical channels;

tuning the LO source to the selected one of the identified one or more of the plurality of optical channels; and mixing the LO optical signal with the second optical signal portion for coherently de-modulating the selected one of the identified one or more of the plurality of optical channels.

12. The method of claim 11, further comprising:

providing the trace presence information or channel presence information to an external controller for selecting the one of the identified one or more of the plurality of optical channels for coherent demodulation.

13. The method of claim 11, further comprising:

using an internal software or hardware logic at the coherent receiver for selecting the one of the identified one or more of the plurality of optical channels for coherent demodulation.

14. A method comprising:

splitting, using an optical splitter, a received optical wavelength-division multiplexing (WDM) signal into first and second optical signal portions,
  the received optical WDM signal comprising one or more optical channels carrying high-speed data signals,
    each of the one or more optical channels being modulated with a low-frequency trace tone uniquely associated with each optical channel of the one or more optical channels;

receiving, using a coherent detection/demodulation circuit (CDC) coupled to the optical splitter, the first optical signal portion and for selectively and coherently demodulating a high-speed data signal, of the high-speed data signals, from one of the one or more optical channels,
  the CDC comprising a tunable local oscillator (LO) source of an optical LO signal;

receiving, using a trace tone detection circuit (TTDC) coupled to the optical splitter, the second optical signal portion and adapted for detecting a presence of a plurality of low-frequency trace tones and for generating a trace detection signal identifying a respective low-frequency trace tone of the plurality of low-frequency trace tones that are present in the second optical signal,
  the TTDC comprising a tunable filter for selecting a particular low-frequency trace tone, of the plurality of low-frequency trace tones, and a decoder for decoding transmitter-generated service messages carried by the plurality of low-frequency trace tones and comprising service data that includes one or more of configuration, maintenance, or diagnostics information; and tuning, using an LO control circuit coupled to the tunable LO source, an optical frequency to a selected optical channel that is selected among the one or more optical channels present in the received optical WDM signal based on trace presence information.

15. The method of claim 14, further comprising:

converting, using a photo detector (PD), the second optical signal portion into an electrical PD signal; and probing, using an electronic trace detector, the electrical PD signal at a plurality of trace tone frequencies corresponding to a plurality of optical channels for detecting their presence in the received optical WDM signal.

16. The method of claim 14, further comprising:

decoding the plurality of low-frequency trace tones modulated using binary phase shift key (BPSK) encoding or frequency shift key (FSK) encoding.

17. The method of claim 14, further comprising:

outputting trace tone presence information obtained from the TTDC to an external controller; and receiving, from the external controller, channel selection signal for tuning the LO frequency to the selected optical channel.

18. The method of claim 14, further comprising:

providing a channel selection signal for tuning the LO frequency to the selected optical channel.

19. The method of claim 14, further comprising:

selecting the selected optical channel based on the trace presence signal received from the TTDC.

20. The method of claim 14, further comprising:

mixing the LO signal with the first optical signal portion for producing one or more mixed optical signals; and the one or more mixed optical signals into the high-speed data signal.

* * * * *